United States Patent [19]

Harbeke

[11] Patent Number: 4,850,385

[45] Date of Patent: Jul. 25, 1989

[54] FIRE STOP PIPE COUPLING ADAPTOR

[76] Inventor: Gerold J. Harbeke, 3257 SW. - 14th Place, Boynton Beach, Fla. 33426

[21] Appl. No.: 269,290

[22] Filed: Nov. 10, 1988

[51] Int. Cl.⁴ .................. F16K 17/38; E04B 5/48
[52] U.S. Cl. ................................ 137/75; 137/79; 285/64; 52/1; 52/232
[58] Field of Search ............ 137/67, 72, 75, 79, 137/77; 52/1, 232, 573; 285/64

[56] References Cited

U.S. PATENT DOCUMENTS

| | | | |
|---|---|---|---|
| 3,726,050 | 4/1973 | Wise et al. | 137/75 X |
| 3,904,111 | 9/1975 | Petersson | 137/67 X |
| 4,072,159 | 2/1978 | Kurosawa | 137/67 |
| 4,109,423 | 8/1978 | Perrian | 52/1 |
| 4,136,707 | 1/1979 | Gaillot et al. | 137/75 |
| 4,221,092 | 9/1980 | Johnson | 52/232 |
| 4,307,546 | 12/1981 | Dolder | 52/1 |
| 4,313,286 | 2/1982 | Harbeke | 285/64 X |
| 4,453,354 | 6/1984 | Harbeke | 285/64 X |
| 4,467,577 | 8/1984 | Licht | 52/232 |
| 4,538,389 | 9/1985 | Heinen | 52/232 X |
| 4,642,956 | 2/1987 | Harbeke | 52/232 |
| 4,724,858 | 2/1988 | Cornwall | 137/75 |
| 4,748,787 | 6/1988 | Harbeke | 52/741 |
| 4,804,160 | 2/1989 | Harbeke | 285/64 X |

OTHER PUBLICATIONS

3M—Fire Barrier Restricting Collar RC-1 (2 pgs.) Date unknown.

Primary Examiner—John Rivell
Attorney, Agent, or Firm—Griffin, Branigan & Butler

[57] ABSTRACT

A fire-stop pipe coupling adaptor (10) comprises a pipe coupling (12) having an intumescent fire stop collar (14) in a metallic band (15) wrapped to form a cylinder (16) thereabout, with the metallic band having outwardly-directed radial tabs (18) at a first cylinder end (19) for attaching the metallic band to a partition (40). The pipe coupling of the adaptor has a male coupling member (46) at a first end thereof for extending into a female end (56) of a cast-in coupling (54) to be attached thereto, thereby allowing an end of the cast-in coupling to be positioned immediately adjacent to the intumescent fire stop collar and the metallic band tabs.

7 Claims, 1 Drawing Sheet

U.S. Patent
Jul. 25, 1989
4,850,385
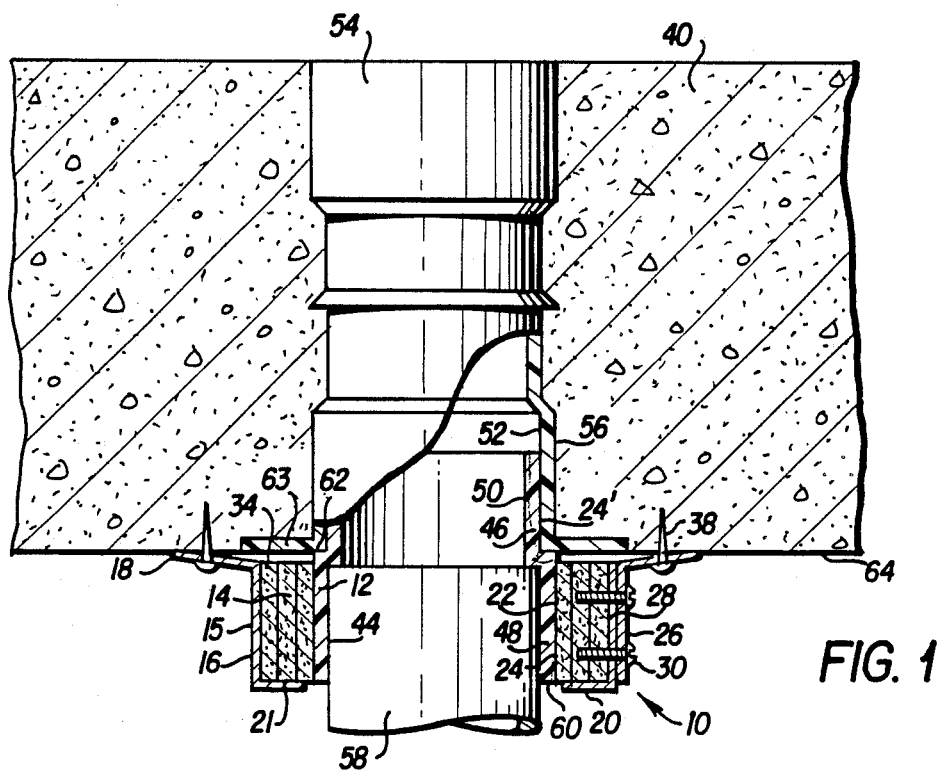
FIG. 1
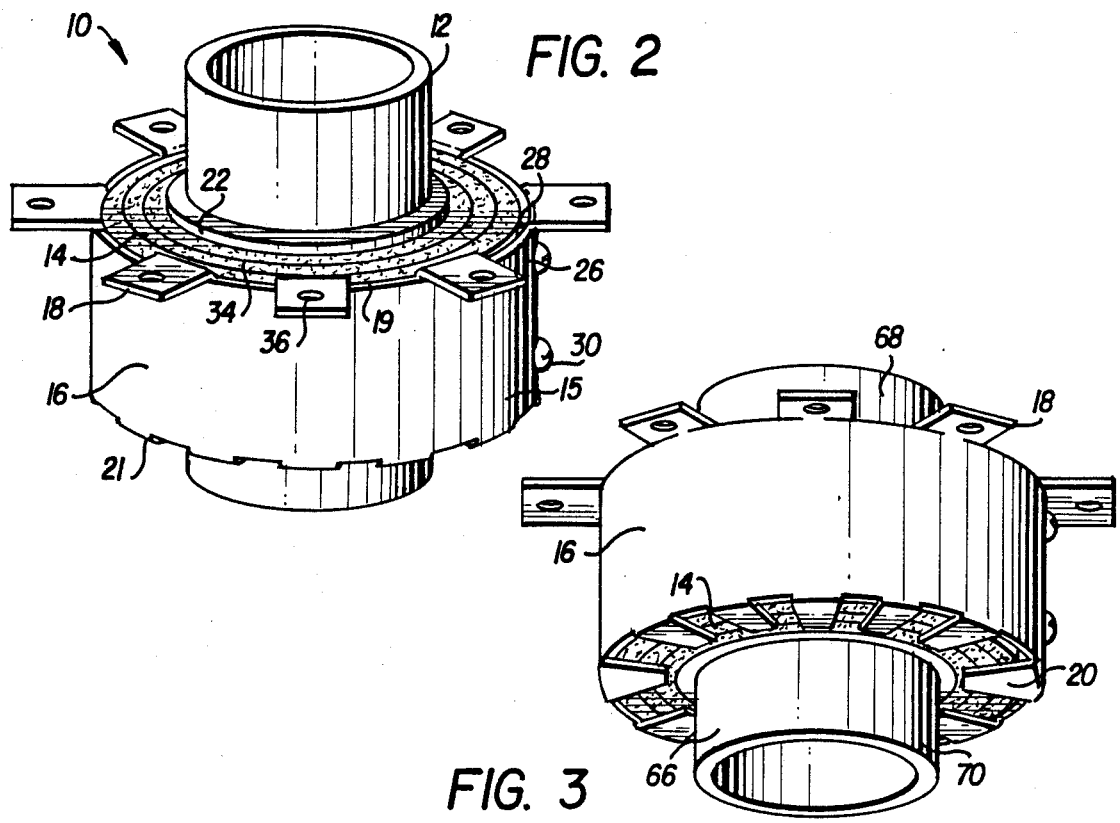
FIG. 2
FIG. 3

FIRE STOP PIPE COUPLING ADAPTOR

BACKGROUND OF THE INVENTION

This invention relates generally to the art of pipe networks for buildings, and especially to apparatus and systems for making pipe networks fire retardant.

For a number of years, pipe networks which have extended through floors of buildings have been made fire retardant by encircling pipes with fire-stop intumescent material which expands upon contact with heat to close the pipes at the floors. It has been suggested to do this by encircling a pipe with a metal container enclosing intumescent material and fastened to a bottom surface of a floor through which the pipe passes. However, a difficulty with such a suggested system is that the intumescent material must normally be installed separately from the pipe and normally must be put in place after a pipe string has been extended through a hole in a floor. Thus, it is an object of this invention to provide an under-floor fire-stop coupling which can be installed at the same time a pipe string is assembled.

Other suggestions have been made for casting pipe couplings having intumescent collars wrapped thereabout into concrete floors when they are poured. Such "cast-in" intumescent collars work quite well with some cast-in couplings, however, other cast-in coupling have outwardly projecting flanges on the lower ends thereof which are used for fastening the couplings to concrete forms. Such flanged cast-in couplings cannot be properly combined with cast-in intumescent fire stop collars because these flanges inhibit heat from reaching the collars. Thus, it is another object of this invention to provide a fire stop adaptor which can be used with "cast-in" couplings that do not have cast-in intumescent fire stop collars mounted thereon.

One problem with many prior-art fire-stop intumescent material collars is that workmen must form them at job sites, which is inconvenient. It is therefore an object of this invention to provide a pipe coupling adaptor with an intumescent collar which can be prepackaged prior to being transported and sold.

It is a further object of this invention to provide a fire-stop pipe coupling adaptor which is easy and relatively inexpensive to construct, but yet which is durable and effective in responding to heat.

SUMMARY

According to principles of this invention, a fire-stop pipe coupling adaptor includes a short pipe coupling having an intumescent fire-stop collar and a metallic band wrapped thereabout and attached thereto. The metallic band has radially-outwardly extending tabs at a first end thereof, which is at a first end of the intumescent fire-stop collar. A first end of the short pipe coupling is a male tube for extending from the fire-stop collar into the end of a cast-in female coupling of a first pipe to be attached thereto while allowing the end of the cast-in coupling to be positioned immediately adjacent to the intumescent fire-stop collar and the outwardly-extending metallic band tabs. A second end of the pipe coupling can be formed of either a male or a female coupling, however, neither the first nor second end extend more than about two inches from the fire-stop collar.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 1 is a side, partially in section, view of a fire-stop pipe coupling adaptor of this invention shown mounted on a cast floor with a cast-in coupling attached to a first end thereof and a second pipe attached to a second end thereof;

FIG. 2 is an isometric view of the fire-stop pipe coupling adaptor of FIG. 1; and FIG. 3 is an isometric bottom view of an alternate embodiment fire-stop pipe coupling adaptor of this invention.

DESCRIPTION OF THE PREFERRED EMBODIMENT

A fire-stop pipe coupling adaptor 10 comprises a male/female pipe coupling 12, a three layer intumescent fire-stop collar 14, and a metallic band 15 rolled into a cylinder, or tube, 16 having outwardly directed radial tabs 18 at a first end 19 thereof and inwardly directed heat collector projections 20 at a second 21 end thereof. The metallic band 15 is a strip of metal that is wrapped tightly about the fire-stop collar 14, so tightly in fact that it permanently mounts the fire stop collar 14 on the pipe coupling 12. It is also possible to place a small amount of adhesive 22 at a contact of the fire-stop collar 14 with an outer surface 24 of the pipe coupling 12. First and second end flaps 26 and 28 of the metallic band 15 are riveted or screwed together by fasteners 30 which extend into layers of the fire-stop collar 14.

The outwardly directed radial tabs 18 are located at the first end 19 of the metallic band cylinder 16 which is also at a first end 34 of the fire-stop collar 14. The radial tabs 18 have holes 36 therein through which fasteners 38 can be extended for fastening the fire-stop coupling adaptor 10 to a barrier such as a concrete cast floor 40 depicted in FIG. 1.

The inwardly-directed heat collector projections 20 help direct force created by the fire-stop collar 14 inwardly when it expands and also enable the metallic band 16 to more readily exchange heat with a fire positioned in a room below the floor 40.

The pipe coupling 12 has an inner surface 44 and forms at a first end thereof a male coupling member 46 and at a second end thereof a female coupling member 48. The male coupling member is a tube having a bore 50 whose outer surface 24' is essentially the same diameter as is an inner surface 52 of a standard female coupling. For example, if a cast-in, female/female, coupling 54, shown in FIG. 1, is for use with 4 inch pipe, the diameter of the inner surface 52 of one of its female ends 56 is 4 ½ inches. Thus, for such a pipe coupling, the outer surface 24' of the male coupling member 46 has a diameter of 4 ½ inches and its bore 50 has a diameter of 4 inches.

The female coupling member 48, on the other hand, has an inner surface 44 with a diameter of 4 ½ for receiving a second 4 inch pipe 58.

It should be noted that in the FIGS. 1 and 2 embodiment, the fire-stop collar 14 and the metallic band 16 are mounted directly on the female coupling member 48 of the pipe coupling 12, with the pipe coupling 12 not extending at a second end 60 thereof beyond the fire stop collar 14. In this regard, the female coupling member 48 need not extend beyond the fire-stop collar 14 because the second pipe 58 can couple with the female coupling member 48 by extending thereinto. On the other hand, since the male coupling member 46 must extend into the cast-in female/female coupling 48 in order to mate with its female end 56, the male coupling member 46 extends approximately 2 inches beyond the first end 34 of the fire-stop collar 14. However, it is noted that when the male coupling member 46 is fully extended into the female end 56 of the cast-in coupling 54, a first end 62 of the cast-in coupling is immediately adjacent to the first end 34 of the fire-stop collar 14. In this regard, the male coupling member 46 must be sufficiently short that a standard female coupling member can be mounted thereon with its end 62 spaced less than ⅜ of an inch from the first end 34 of the fire-stop collar 14, which means that the male-coupling member 46 should not be longer than 2 inches and that its base should be within ⅜ of an inch from the first end 34 of the fire-stop collar 14.

Describing next use of the fire-stop pipe coupling adaptor 10 shown in FIGS. 1 and 2, first a cast-in coupling 54 is mounted on a form (not shown) before the concrete floor 40 is cast by nailing its flange 63 to the form (not shown). This flange 63 renders inappropriate use of a "cast-in" intumescent collar because it does not allow heat to come into quick contact with any such collar. Thus, such "cast-in"collars are not normally used with flanged cast-in couplings and none is shown in the drawings. Thereafter, concrete is poured into the form and hardens to form the concrete floor 40. Thereafter, the form is removed and the fire-stop pipe coupling adaptor 10 is mounted below the floor 40 as shown in FIG. 1. In this respect, the male coupling member 46 is inserted into the female end 56 of the cast-in coupling 54 from its first end 62 until the first end 34 of the fire-stop collar 14 is in contact with, or almost in contact with lower surface 64 of the floor 40. The male coupling member 46 of the pipe coupling 12 is, of course,-solvent welded to the cast-in coupling 54. Thereafter, the fasteners 38 are driven through the radial tabs 18 into the floor 40 to further hold the fire-stop pipe coupling adaptor 10 in position should the pipes melt. Thereafter, the second pipe 58 is inserted into the female coupling member 48 of the pipe coupling 12 and solvent welded thereto. Should a fire occur in the room below the floor 40 the fire-stop collar 14 will expand, thereby crimping the pipe coupling 12, and the pipe 58 to close off the opening through the floor 40 caused by the cast-in coupling 54.

The embodiment of FIG. 3 is essentially the same as that of FIGS. 1 and 2 with the exception that a pipe coupling 66 thereof is not a male/female pipe coupling as is the pipe coupling 12 of FIGS. 1 and 2, but rather is a male/male pipe coupling. That is, it has 2 inch male tubular projections 68 and 70 at first and second ends thereof. In fact, the pipe coupling 66 can be a standard pipe with the metallic band cylinder 16 and fire stop collar 14 clamped thereon. The tubular male projections 68 and 70 are sufficiently short so that they can fit into standard female coupling bells with ends of the bells being immediately adjacent first and second ends of the fire-stop collar 14.

The FIG. 3 embodiment is used by inserting the first tubular male protection 68 into a female end 56 of the cast-in coupling 54 and the radial tabs 18 thereof are fastened to the lower surface 64 of the floor 40. Thereafter, a standard female coupling must be slipped over the second tubular male projection 70 until its end is up against, or less than ⅜ inches from, the fire-stop collar 14.

It can be appreciated by those skilled in the art that the fire-stop pipe coupling adaptor of this invention can be readily used with cast-in couplings which were not combined with cast-in intumescent collars. For example, cast-in couplings having flanges on ends thereof for attaching them to concrete forms. It will also be appreciated by those of ordinary skill in the art that the fire-stop pipe coupling adaptor of this invention can be relatively easily manufactured in a factory and shipped as one piece. That is, it is durable. Further, the first-stop pipe coupling adaptor of this invention gives plumbers a great deal of flexibility when installing pipes in large buildings, allowing them to easily install fire-stop collars on pipe strings with previously cast-in couplings.

While the invention has been particularly shown and described with reference to a preferred embodiment, it will be understood by those skilled in the art that various changes in form and detail may be made therein without departing from the spirit and scope of the invention.

The embodiments of the invention in which an exclusive property or privilege are claimed are defined as follows:

1. A fire-stop pipe coupling adaptor comprising:
   a pipe coupling having an elongated tubularly-shaped main body with first and second ends, said elongated tubularly-shaped main body having an inner surface and an outer surface, said elongated tubularly-shaped main body including first and second coupling means respectively at said first and second ends for respectively coupling said first and second ends to first and second pipes separate from said pipe coupling;
   an intumescent fire-stop collar wrapped about and attached to the outer surface of said tubularly-shaped main body, said intumescent collar being constructed of a material which expands when it gets hot to close off the inner surface of said tubularlyshaped main body;
   a closed tubularly-shape-d metallic band wrapped about and attached to a circumferential periphery of said intumescent collar; and
   a metallic-band tab attached to a first end of said tubular band adjacent said first end of said elongated tubularly-shaped main body and extending radially outwardly therefrom for receiving attaching fasteners for attaching said metallic band to a partition;
   wherein said first coupling means is a short male tube for extending int-o an end of a female coupling of said first pipe but allowing the end of said first pipe to be positioned immediately adjacent said intumescent fire-stop collar and-said metallic band tab when said first coupling means is coupled to said first pipe;
   whereby said first-stop pipe coupling can be coupled to said female coupling of said first pipe when said first pipe is embedded in a partition by inserting the first coupling means into said female coupling and fastening said metallic-band tab to an outer surface of said partition, thereby allowing said second pipe to be attached to said second coupling means and creating a fire stop at the partition in the pipe string thereby created.

2. A fire-stop pipe coupling adaptor as in claim 1, wherein said second coupling means is a female coupling means for receiving therein, and coupling with, said second pipe.

3. A fire-stop pipe coupling adaptor as in claim 1, wherein said second coupling means is a male coupling tube for extending into, and coupling with said second pipe.

4. A fire-stop pipe coupling adaptor as in claim 3, wherein said second male coupling is less than 2 inches long and allows an end of said second pipe coupled thereto to be located immediately adjacent said intumescent fire-stop collar.

5. A fire-stop pipe coupling adaptor as in claim 1, wherein said first coupling is less than 2 inches long, and allows an end of said first pipe couple thereto to be positioned immediately adjacent an end of said intumescent fire-stop collar.

6. A method of preparing a pipe string through a partition with a fire stop at said partition to prevent a fire on one side of the partition from spreading to the other side of the partition, said method comprising the steps of:

casting a cast-in pipe coupling in said partition with one end of said pipe coupling opening to one side of the partition and the other end of said pipe coupling opening to the other side of said partition, said one end of said pipe coupling forming a female bell for receiving a male pipe coupling;

coupling to said one end of said cast-in coupling a fire-stop pipe coupling adaptor comprising a pipe coupling having an elongated tubularly-shaped main body with first and second ends, said elongated tubularly-shaped main body having an inner surface and an outer surface, said elongated tubularly-shaped main body including first and second coupling means respectively at said first and second ends for respectively coupling said first end to said cast-in coupling and said second end to a second pipe separate from said pipe coupling, said fire-stop pipe coupling adaptor further comprising an intumescent fire-stop collar wrapped about and attached to the outer surface of said tubularly-shaped main body, said intumescent collar being constructed of a material which expands when it gets hot to close off the inner surface of said tubularly-shaped main body, and said fire-stop pipe coupling adaptor further comprising a closed tubularly-shaped metallic band wrapped about and attached to a circumferential periphery of said intumescent collar including a metallic-band tab attached to a first end of the tubular band adjacent the first end of said elongated tubularly-shaped main body and extending radially outwardly therefrom for receiving attaching fasteners for attaching said metallic band to a partition, said first coupling means being a short male tube which, in this step, is coupled to said cast-in pipe coupling by extending into said female bell at said one end of said cast-in pipe coupling but leaving the end of said cast-in pipe coupling positioned immediately adjacent said intumescent fire-stop collar and said metallic band tab;

attaching said metallic-band tab to said partition by driving said attaching fasteners through said tab into said partition; and attaching a second pipe to said second end of said pipe coupling main body.

7. A method as in claim 6, wherein said second coupling means is a female coupling bell and wherein said step of attaching said second pipe to said pipe coupling main body includes the substep of inserting said second pipe into said second coupling means.

* * * * *